April 17, 1945.  H. O. STEPHENS  2,374,049

ELECTRICAL INDUCTION APPARATUS

Filed Nov. 26, 1943

Inventor:
Howard O. Stephens,
by Harry E. Dunham
His Attorney.

Patented Apr. 17, 1945

2,374,049

UNITED STATES PATENT OFFICE 2,374,049

ELECTRICAL INDUCTION APPARATUS

Howard O. Stephens, Pittsfield, Mass., assignor to General Electric Company, a corporation of New York Application November 26, 1943, Serial No. 511,853

1 Claim. (Cl. 175—356)

This invention relates to high-tension transformers and more particularly to those high-tension transformers which are connected up as autotransformers, and has for its general object a substantial improvement in the reliability and economy.

Figure 1:
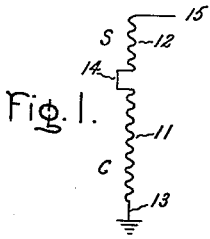
Figure 2:
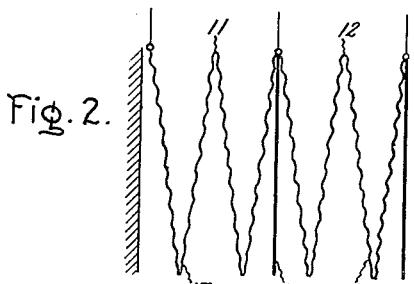
Figure 3:
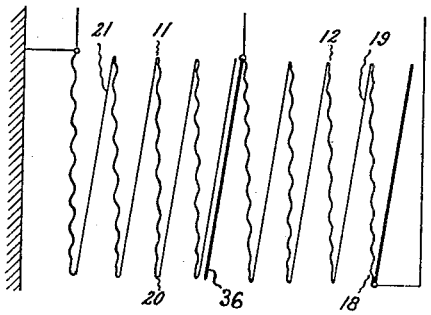
Figure 4:
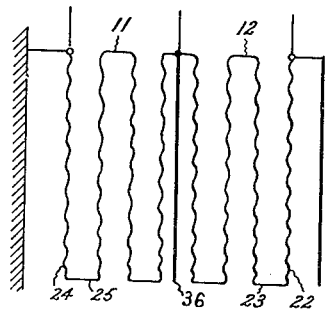
Figure 5:
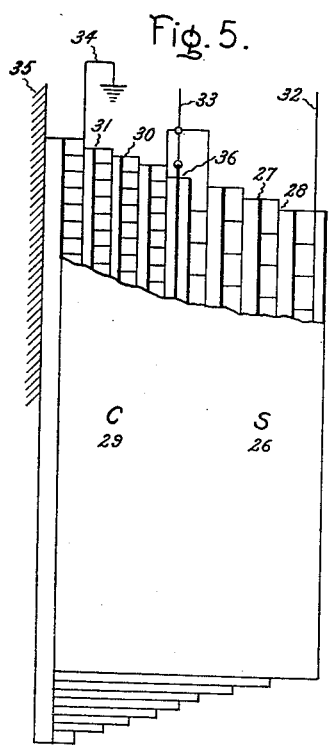

Other objects and advantages of the invention will be evident from the following description with the help of the accompanying drawing in which Fig. 1 illustrates diagrammatically the circuit of an autotransformer; Figs. 2 to 4 illustrate somewhat diagrammatically autotransformers which are provided with embodiments of my invention; Fig. 5 is a side elevation in partial section of a concentric layer wound winding provided with an embodiment of my invention, and Figs. 6 to 9 show impulse voltage curves which are used in the description of my invention.

A typical autotransformer has two windings like a typical static transformer, but while in the latter the two windings are completely insulated from each other, in the former they are conductively connected to each other in series connection as illustrated diagrammatically in Fig. 1 by windings 11 and 12. The arrangement of the windings provides three circuit leads, 13, 14 and 15, lead 14 coming from the junction of the two windings. One of the end leads, for instance, 13, may be grounded or form the neutral point of a three-phase bank, in which case the other end lead, 15, becomes the high-tension terminal of the autotransformer, with 14 as the low-tension terminal. Winding 12 is then spoken of as the series winding, S, and 11 as the common winding, C.

This manner of connection of the windings of an autotransformer makes it very economical in materials compared with a transformer. For instance, if the voltage of the series winding is $E_s$, and that of the common winding $E_c$, and the two windings capable of delivering a power $P_t$ as a transformer, they can deliver when connected up as an autotransformer, a power $P_a$ defined by the formula $$P_a = P_t \frac{(E_s + E_c)}{E_s}$$

from which it will be seen that if $E_s$ and $E_c$ are alike, $P_a$ is twice $P_t$; that is, the same windings can deliver twice as much power in autotransformer connection than in transformer connection.

This economy of autotransformers makes them very attractive for general use, but the very connection which is responsible for this economy also subjects the low-tension circuit to the disturbances of the high tension circuit, for which reason autotransformers are relatively little used in high-tension systems. It is an object of the present invention, therefore, to provide an advantageous physical arrangement and simple appropriate shielding means for autotransformer windings whereby these troubles may be mitigated, and the advantages and economies of autotransformers made more generally available.

A characteristic of the series and of the common windings of an autotransformer, with an important bearing on the present invention, is the fact that while their voltages may be widely different, their k. v. a. ratings or physical capacities are always alike, so that even though the series winding, S, may have one-tenth as much voltage and therefore one-tenth as many turns as the common winding, C, it may have physical dimensions comparable to that of C when the conductor for S has ten times as much current capacity as that of C. As a consequence, although the composite autotransformer winding is a continuous winding between the terminals 13 and 15, it cannot be treated as a single uniform winding, and the low-voltage lead 14 as if it were a tap taken off this uniform winding. For instance, the winding which has the smaller conductor and more numerous turns has a high average space potential gradient than the other, and it becomes impractical to make provisions for the electrostatic voltage problems of the composite winding structure as if they were those of a uniform winding.

Figures 8, 9:
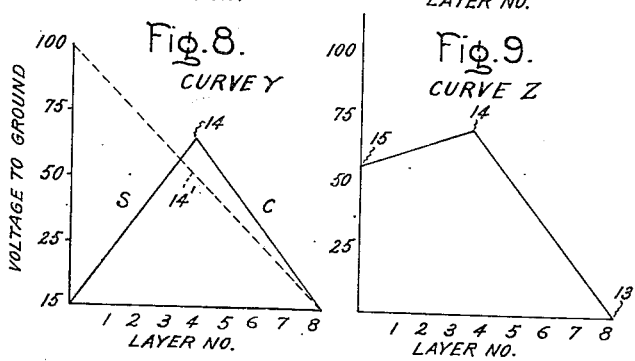

The construction of high-tension autotransformers in the past has followed the same general plan as that of high-tension transformers, the series and the common windings taking the form of either "pancake" coils interleaved with each other in "shell-type" fashion, or preferably, as two solenoidal stacks of disc coils mounted concentric with each other or various modifications thereof. The problem of providing electrostatic shielding for them has also been considered, and a comprehensive exposition of it will be found in a scientific paper by K. K. Paluev under the title of "Effect of transient voltages on power tranformer design—III. Non-resonating auto-transformer," in the transactions of the American Institute of Electrical Engineers for 1931, vol. 50, pp. 803–809. It is pointed out in that paper that the re-entrancy of the series and common windings in the former ("shell-type") arrangement is characterized with a plurality of points of discontinuity, and militates against the securing of a satisfactory impulse voltage distribution and freedom from resonance; while with respect to the latter type of construction, it is seen in Fig. 8 of that paper that good results are obtainable when separate shields are provided for the series and for the common windings, and that even then, under certain conditions, for instance, condition CW in that figure, the voltage distribution is not ideal.

It is an object of the present invention to provide a winding and shielding arrangement in which a single set of shields serves both the series and the common windings, and in which the windings are non-resonating under all conditions. The economy is not only in the number of the shields required but—the more important item—greatly simplified and more efficient utilization of insulation space, which results in a significant reduction in the weight of the entire transformer.

In the practice of my invention, I arrange the series and the common turns in a plurality of unbroken concentric layers as illustrated in Figs. 2-5 inclusive of the present specification—diagrammatically in Figs. 2-4 inclusive, and in elevation and partial cross-section in Fig. 5. Thus in Fig. 2 I have illustrated an autotransformer including a series winding 12 provided by a plurality of concentric layers 16 while the common winding 11 has a plurality of concentric layers 17. In this construction it will be seen that the concentric layers progress so that the distance between adjacent layers is proportional to the voltage between each of the layers. In Fig. 3 I have illustrated an autotransformer including a series winding 12 having a plurality of layers 18, the opposite ends of which are connected together by crossovers 19. The common winding 11 also includes a plurality of layers 20 connected together, the opposite ends of which are connected together by crossovers 21. Fig. 4 shows an autotransformer including a series winding 12 provided by a plurality of concentric conductor layers 22 the adjacent ends of which are connected together by crossovers 23. Also the common winding 11 is made up of a plurality of layers 24 the adjacent ends of which are connected together by crossovers 25. In each of the constructions shown in Figs. 2, 3 and 4 the concentric windings have approximately the same axial length, while in Fig. 5 the layer wound windings are tapered with a series winding 26 having a plurality of layers 27 formed by conductors 28. The common winding 29 is provided by winding a conductor 30 to form a plurality of tapered layers 31. A line terminal 32 is provided and a terminal 33 is placed between the series and common winding and the opposite end of the common winding may be grounded as is shown at 34. The winding surrounds a core which is diagrammatically shown at 35.

In the specific illustraed cases, Figs. 2 through 5, I have shown for simplicity both the series and common windings as including four concentric layers each. The invention however may be employed with any suitable number of layers in the series and common windings. However, it is a feature of my invention that the number of layers of the series winding, which winding in general has a smaller winding voltage and a fewer turns, is about the same order of the number of layers of the common winding for reasons which will be brought out as the description proceeds. Thus Fig. 5 shows a series winding 26 which has only one-half as many turns as the common winding and yet the same number of layers, by winding the series winding with a conductor 28 which has twice the width as the conductor 30 which is used to form the common winding layers. Thus in spite of the dissimilarity of the number of turns, a structural control is secured to yield improved voltage conditions, more effective use and disposition of electrostatic shield means, and substantial economies overall.

In ordinary high voltage transformers the shield is provided near the line end and connected to the high voltage line since the impulse will approach the transformer from the line. However, in an autotransformer since an overhead line may also be connected between the series and common windings, there is the problem of shielding the series and common windings both ways from the connection 33 of Fig. 5 as the surge may also strike the transformer from line 32. In order to provide a shield arrangement for both the series and common windings I provide in the construction as shown in Figs. 2, 3, 4 and 5 between the series and common windings, a shield arrangement indicated by the numeral 36, which may be electrically connected with the common line 32 as is illustrated in Fig. 5. Furthermore, since in this type of construction a division of voltage between the series and common windings is primarily dependent on the layer to layer distribution of voltage, and only to a limited extent on the turn to turn distribution, by employing a common shield 36 between the series and common windings with an autotransformer in which the number of layers in the series winding is of the same order as that of the common winding, I have provided an improved shielding arrangement which has characteristics which will be brought out below in connection with Figs. 6 through 9.

Furthermore, when the layers progressively decrease from the low voltage to the high voltage end as is shown in Fig. 5 the series and common shield 36 will also prevent any equipotential line from crossing over the ends of the adjacent layers and thereby prevent cusps. This phenomenon is described in further detail and claimed in my copending application S. N. 417,510, filed November 1, 1941, and assigned to the same assignee as this present invention.

Figures 6, 7:
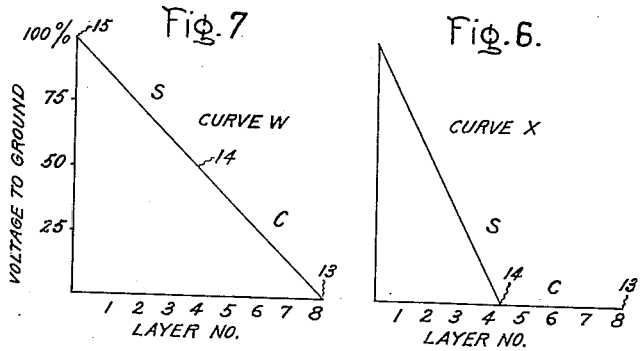

In presenting the impulse voltage characteristics of this general construction, we may consider the matter under four significant conditions of the system in which the autotransformer may be installed. Thus, let X represent the most common condition in which both the high-voltage lead (15) and the low-voltage lead (14) are connected to extensive transmission lines, and an impulse voltage, such as a lightning voltage, comes on the high-voltage line. The voltage distribution is depicted in Fig. 6. By virtue of the fact that the transmission line connected to lead 5 is certain to have a surge impedance many times as small as the surge impedance of the autotransformer, initially the common winding, C, behaves as if both terminals were grounded, that is, as if C were short-circuited; and, therefore, the full impressed voltage appears across the series winding S regardless of its number of turns or layers or (practically) its capacitance. This is one of the reasons why it is highly advantageous to have S in many layers, for instance as many as that of C, or even more.

It may be pointed out that in this arrangement there is no internal rise of voltage within C to give rise to an internal oscillation—an advantage over the prior practice recorded in the above-mentioned Paluev paper.

Let now W represent the modified condition in which the low-voltage lead or its bus is isolated from its line, while the high-voltage lead is still connected to its line. The corresponding impulse-voltage distribution is represented in Fig. 7, a generally straight line. The arrangement of the two windings as indicated above, naturally tends to give this type of a distribution without resort to expensive modifications or auxiliary means to achieve it.

A voltage distribution which is linear with respect to the layers (in an autotransformer), is not necessarily linear with respect to the turns; but the latter condition is not necessary, and the condition depicted in Fig. 7 corresponds to the sinusoidal distribution described in the U. S. Patent 2,305,357 to K. K. Paluev.

Precise linearity is not essential in the graph of Fig. 7, and the potential of lead 14 may be somewhat higher or lower, as insulation for condition X (Fig. 6) is permissive of a lower value, and it will be shown presently that another condition, Y (Fig. 8), is permissive of a somewhat higher value.

Considering now a third likely condition, Y, namely both high and low-voltage leads, 15 and 14, connected to their respective transmission lines, and an impulse voltage coming in on line 14, the resulting distribution is shown by the solid line in Fig. 8, a uniform voltage distribution in both windings. The intensity of the incoming impulse in this case will be less than in Figs. 6 and 7; and for the purposes of the present exposition, the high and low-voltage line impulses may be taken as proportional to the respective operating voltages. The graph of Fig. 7 is reproduced in Fig. 8 as a dashed line for a comparison of the potentials of lead 14 on the two graphs (points 14 and 14$^I$). As point 14 is controlled by external conditions and is higher than 14$^I$, it follows that the graph of Fig. 7 may deviate from a straight line upward to that extent without requiring a higher insulation than what has to be provided for other reasons.

Finally, considering a fourth condition, Z, in which the high voltage lead may be isolated, with an impulse voltage coming in over the low-voltage lead, the impulse-voltage distribution is shown in Fig. 9. Here, portion 13—14 of the graph is the same as in Fig. 8 but in 14—15 the potential of point 15 is raised above ground depending on the ratio of the capacitance between 16 and 17 of the capacitance between 17 and outer ground.

If now we consider the characteristics of the present invention from the standpoint of the insulation required by the electrostatic shield elements, it will be observed that it is merely that of a single (adjoining) layer voltage (Figs. 2–4 inclusive), and no particular increase in insulation is required on account of the presence of the electrostatic element, in marked contrast to prior art.

The principle of the invention, and how it may be carried out, having been clearly explained, various modifications thereof will occur to those skilled in the art; and, therefore, in the appended claim I aim to include all those modifications which do not depart from the spirit of the invention.

What I claim as new and desire to secure by Letters Patent of the United States is:

An electrical autotransformer comprising a winding-structure including a series winding and a common winding connected to each other in series-circuit relationship, each one of said series and common windings comprising a plurality of conductor turns in a plurality of concentric winding layers, said series winding including at least as many layers as said common winding, each one of said layers extending axially the full axial length of that winding at the level of said layer, a low tension lead connected to the interconnection of said two windings and adapted to be connected to a transmission line, a high tension lead connected to the free end of said series winding and adapted to be connected to another transmission line, a neutral lead connected to the free end of said common winding and adapted to form the neutral of a polyphase bank, three electrostatic voltage-controlling elements, one of said elements being disposed around said series winding and connected to said high tension lead, another of said elements being disposed between said series and common windings, and the third of said elements being disposed adjacent the common winding on the side opposite from said series winding, said three electrostatic elements being so proportioned and disposed with respect to said winding layers as to cause a substantially uniform potential distribution among the layers of each one of said series and common windings when an impulse potential is impressed between said low-tension lead and either one of said other leads and a potential division between said series and said common windings at least as favorable to the common winding as the division of the operating voltage when an impulse potential is impressed between the terminal leads of said composite winding with the low-tension lead being isolated.

HOWARD O. STEPHENS.